Fig. 1

INVENTOR
Arthur H. Kiehl
BY McCoy, Greene + deGrotenhuis
ATTORNEYS

Dec. 8, 1959  A. H. KIEHL  2,916,112
METAL WINDOW CONSTRUCTION
Filed March 8, 1957  9 Sheets-Sheet 3

INVENTOR
*Arthur H. Kiehl*
BY *McCoy, Greene + LeGrotenhuis*
ATTORNEYS

Dec. 8, 1959 A. H. KIEHL 2,916,112
METAL WINDOW CONSTRUCTION
Filed March 8, 1957 9 Sheets-Sheet 7

INVENTOR
Arthur H. Kiehl
BY McCoy, Greene + LeGrotenhuis
ATTORNEYS

Dec. 8, 1959          A. H. KIEHL          2,916,112
METAL WINDOW CONSTRUCTION Filed March 8, 1957          9 Sheets-Sheet 9

INVENTOR
Arthur H. Kiehl
BY McCoy, Greene + deGrotenhuis
ATTORNEYS

2,916,112
METAL WINDOW CONSTRUCTION

Arthur H. Kiehl, Rocky River, Ohio, assignor to The F. C. Russell Company, Cleveland, Ohio, a corporation of Ohio Application March 8, 1957, Serial No. 644,851

13 Claims. (Cl. 189—75)

This invention relates to windows and particularly to a window that has a metal frame provided with an inner portion adapted to house a primary window assembly and an outer portion adapted to house a removable insulating or storm window assembly.

The window frame of the present invention has one-piece metal jambs of identical cross section, a one-piece metal head and a one-piece metal sill. The jambs, head and sill are cut to length from extruded structural shapes of a metal such as aluminum, and welded together at the corners to form a rigid frame. The frame members may be cut to length at the factory and welded together in the field if desired, and the sections are so formed that the window assemblies may be readily mounted therein after the frame is installed in a window opening.

The frame members are so formed that the inner portion of the frame is adapted to receive a primary window assembly and the outer portion thereof an insulating or storm window assembly. The structural shapes employed for the jambs, head and sill are so formed that the frame can readily be adapted to various types of buildings and to various types of window assemblies. By providing the structural shapes with easily removable portions on the sides thereof which form the exterior of the window frame, frames may be adapted to building walls having various types of external covering such as brick veneer, stucco, various types of siding, or plain masonry or concrete walls, and frames may be mounted side by side or superposed in various multiple window arrangements. By providing easily attachable auxiliary frame members, the primary and insulating member assemblies may include sashes that are slidable vertically or horizontally, or, when desired, a primary window may be of the picture window type with a single fixed glass pane, in which case an insulating window in the form of a single removable panel may be provided.

The frame members are so formed that the frame is provided with positioning portions intermediate the front and rear sides of the frame that are engageable with the exterior of a building wall around the window opening to position the primary window receiving portion of the frame within the building opening. The outer insulating or storm window receiving portion of the frame is preferably wider than the inner primary window receiving portion and the jamb sections are so formed that coplanar positioning parts are provided intermediate the prime window receiving portion and the insulating window receiving portion. The frame positioning portion of the frame preferably includes outwardly projecting substantially coplanar attaching flanges integral with the jambs and head. The insulating window receiving portions of the frame may be provided with outwardly projecting stop flanges spaced outwardly from the attaching flanges and parallel thereto, to provide positioning means for wall facings such as siding, stucco or veneer.

By removing the outwardly projecting flanges above referred to, the window frames of the present invention may be mounted side by side, or in superposed relation in a building opening and, to facilitate removal of these flanges, the attaching and stop flanges are provided with weakening grooves that extend along their bases, so that they can be readily broken off to permit jambs of adjacent frames to be attached together side by side or the sill of one frame to be imposed upon and secured to the head of another.

In windows in which the primary window assembly includes a plurality of glass panes, one of the primary window panes is a fixed pane mounted in seats formed in the window frame, and the remaining glass panels of the primary and insulating window assemblies are each mounted in a sliding sash.

The portions of the window frame jambs and head that form the inner primary window receiving part of the frame are provided with alined inwardly projecting flanges along the outer edge of the primary window receiving part, with ledges inwardly of these flanges, and with narrow channels inwardly of the ledges. The flanges and ledges provide seats for positioning a glass pane and the channels are adapted to receive retaining strips for the glass pane so that the glass pane can be quickly and easily mounted in the frame after the frame is secured in the wall opening.

A fixed glass pane may occupy the entire window opening, or may occupy part only of the frame opening. In the latter case, a window sash is mounted to slide from a closed position covering the space not closed by the fixed pane, to a position alongside the fixed pane, the frame members being provided with sash guiding portions inwardly of the fixed pane seats. The frame is constructed to permit all of the screens and sliding sashes to be inserted into the frame from the inside after mounting of the fixed glass pane and to be removed from the inside of a window opening.

In order to compensate for any irregularities in the frame opening and to make it unnecessary to maintain a close tolerance in the dimensions of the window opening, the frame is centered in a window opening by means of a series of springs interposed between the jambs, head and sill and the interior of the window opening. To facilitate entry of the frame into the window opening, the springs are in the form of curved resilient sheet metal plates that are mounted externally of the frame members inwardly of the positioning flanges, the springs being formed to provide inclined face portions that have wedging engagement with the interior of the window opening, so that they are compressed when the frame is pushed into the window opening.

The window frame structure may include a tubular trim casing that covers the interior of the wall opening inwardly of the frame and that is provided with a trim portion at right angles to the tubular portion for engagement with the interior of the building wall around the window opening. The tubular rectangular body of the trim casing is adapted to receive the inner edge portion of the window frame and is clamped to the inner edge of the frame by means of the spring mounting members.

The trim casing is formed of four members of identical cross section provided with end portions that are adapted to interlock to permanently connect the four members to form the rectangular tubular casing, with the trim flanges coplanar and provided with mitered interfitting portions at the corners.

The invention has for an object to provide jamb, head and sill frame members in the form of extruded structural shapes that may be employed in various types of building walls, in various window arrangements and with various types of primary and insulating window assemblies.

A further object of the invention is to provide a mounting for the window frame in the window opening which automatically centers the frame with respect to the opening.

A further object is to provide a trim casing for covering the inner portion of the window opening that is composed of the four sections having end portions formed to provide interlocking connections at the corners which when interlocked permanently connect the sections to form a rectangular tubular casing.

Reference should be had to the accompanying drawings forming a part of this specification, in which.

Referring to the accompanying drawings, the window of the present invention has a frame formed by jambs A, a head B and a sill C. The jambs A are of identical cross-sectional shape, being cut to length from extruded metal structural shapes formed from a metal such as aluminum. The head B which connects the upper ends of the jambs A, is also an extruded structural shape and the same is true of the sill C which connects the lower ends of the jambs A.

The jambs A have an inner portion 1 that forms parts of a housing for a primary window assembly and an outer portion 2 that forms parts of a housing for an insulating window assembly. The outer frame portion 2 of each jamb is offset with respect to the inner frame portion 1 and the jambs A are provided with flat connecting webs 3 that are disposed between the inner and outer frame portions 1 and 2 and disposed at right angles to portions of the jamb on opposite sides thereof. The jambs have exterior attaching flanges 4 integral therewith extending the full length thereof and disposed in the plane of the connecting portions 3. The attaching flanges 4 are provided with grooves 5 along their bases, which weaken them sufficiently to enable the flanges to be broken away from the body portions of the jambs when desired. The flanges 4 also have grooves 6 parallel to the grooves 5 and between the same and the free edges of the flanges, which provide break lines intermediate the bases and edges of the flanges, so that short attaching flanges may be provided when desired, such short flanges being desirable for some types of building construction.

The jambs A are each provided with a narrow interiorly facing channel 7 a short distance inwardly of its connecting webs 3 and with a wider interiorly facing channel 8 spaced inwardly from the channel 7. At their inner edges the jambs are provided with flanges 9 that form the inner walls of the channels 8. At their inner edges the jambs also have exteriorly projecting flanges 10 in the plane of the flanges 9 that are out-turned at their edges to provide wide edge faces 11. Short L-shaped exterior flanges 13 project from the bottoms of the channels 7 and have their edge portions 14 turned outwardly toward the connecting webs 3. Between the channels 7 and the connecting webs 3, the jambs are provided with interiorly projecting flanges 15 which are spaced outwardly from the grooves 7 to provide window pane positioning ledges 16.

The insulating window receiving portions 2 of each jamb A is provided with spaced interior flanges 17 and with an exterior flange 18 extending the full length of the jamb and spaced outwardly from the attaching flanges 4, the flange 18 serving as a stop or positioning member for certain types of wall facings and being provided with a weakening groove 19 along its base so that it can be broken away from the body of the jamb when desired. Along their outer edges the jambs have inturned flanges 20 parallel to the flanges 17 and 18.

Figures 3, 4:
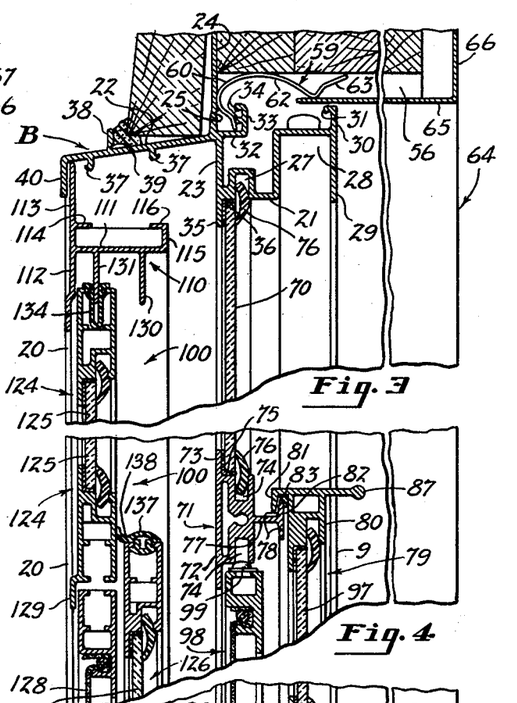
Fig. 3 is a fragmentary transverse vertical section through the window frame head, taken on the line indicated at 3—3 in Fig. 1.
Fig. 4 is a fragmentary transverse vertical section through the central crossbar of the frame, taken as indicated at 4—4 in Fig. 1.

As shown in Fig. 3, the window frame head B is provided with an inner portion 21 that is alined with the inner portions 1 of the jambs, and outer portions 22 that are alined with outer portions 2 of the jambs A. The portions 22 of the head B are offset upwardly with respect to the adjacent inner face of the portions 21 and a vertical connecting web 23 is provided between the portions 21 and 22 of the head. An integral attaching flange 24 projects upwardly from the head B in the plane of the attaching flanges 4 of the jambs A. The flange 24 has an inner weakening groove 25 adjacent its base and parallel thereto and an outer weakening groove 26 above and parallel to the groove 25, so that the outer portion of the flange may be broken away along the groove to provide a flange of less height, or the flange may be broken away near its base.

The inner portion 21 of the head B is provided with a narrow downwardly opening channel 27 that is alined with the channels 7 of the jambs and wider channels 28 that are alined with the channels 8 of the jambs. At its inner edge the head is provided with a downwardly projecting flange 29 in the plane of the flanges 9 of the jambs, and an upwardly projecting flange 30 in the plane of the flange 29 that is outturned at its upper edge to provide a wide edge face 31.

Above the channel 27 the head B is provided with an inwardly projecting portion 32 and a flange 33 extending upwardly from the inner edge of the portion 32 parallel to the attaching flange 24, the flange 33 providing an upwardly opening channel along the inner side of the attaching flange 24 and having spaced ribs 34 projecting into the channel. The head B is provided with a flange 35 projecting downwardly from its inner face in the plane of the connecting web 23 and spaced outwardly from the channel 27 to provide a glass pane receiving ledge 36 that alines with the window ledges 16 of the jambs.

The outer portion 22 of the head B is preferably inclined downwardly toward its outer edge and has spaced parallel longitudinally extending hook flanges 37 projecting downwardly from its interior face. A stop flange 38 in the plane of the flanges 18 of the jambs projects upwardly from the exterior of the portion 22 of the head and this flange is provided with a weakening groove 39 along its base to permit it to be broken away from the body of the head when desired. At its outer edge the head B has a down-turned flange 40 that serves as a retainer for an insulating window assembly.

The sill C has an inner portion 41 alined with the inner portions 1 and 21 of the jambs and head, and an outer portion 42 alined with the outer portions 2 and 22 of the jambs and head. The outer portion 42 is preferably inclined downwardly and outwardly to facilitate drainage, and a vertical connecting web 43 in the plane of the connecting web 23 of the head extends upwardly from the portion 42 and joins the same to the portion 41 of the sill. The sill has a short flange 44 projecting downwardly therefrom in the plane of the connecting web 43, and a second short flange 45 projecting downwardly and spaced outwardly from the flange 44 to provide a narrow downwardly facing channel 46. Inwardly of the connecting web 43 the sill is provided with a ledge 47 that is preferably inclined downwardly at a small angle to facilitate drainage and inwardly of the ledge 47 and spaced upwardly therefrom is a second ledge 48. At the inner edge of the sill there is an upwardly projecting flange 49 that is coplanar with the flange 29 of the head. In the plane of the flange 49 there is a downwardly projecting flange 50 that is turned outwardly at its lower edge to provide a wide edge face 51. Spaced outwardly from the flange 49 on the ledge 48 and parallel therewith there is a vertically disposed beaded guide rib 52. Beneath the ledge 47 there is a short downwardly projecting flange 53 spaced inwardly from the web 43 with a lower edge portion 54 turned outwardly toward the web 43, and the outer edge of the sill is provided with a downturned flange 55.

Figure 1:
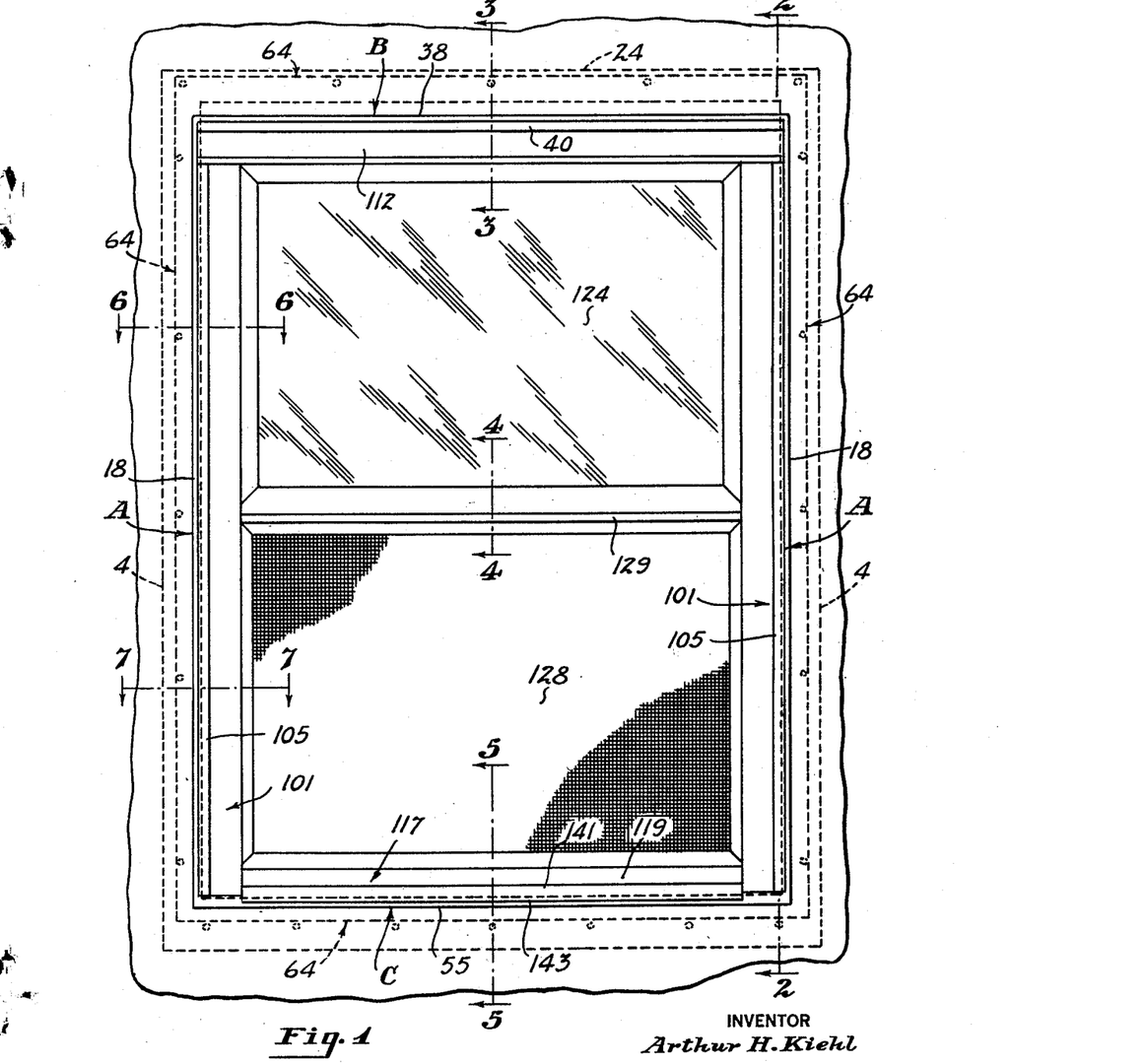
Figure 1 is a front elevation of a window embodying the invention having vertically sliding sashes.
Figure 2:
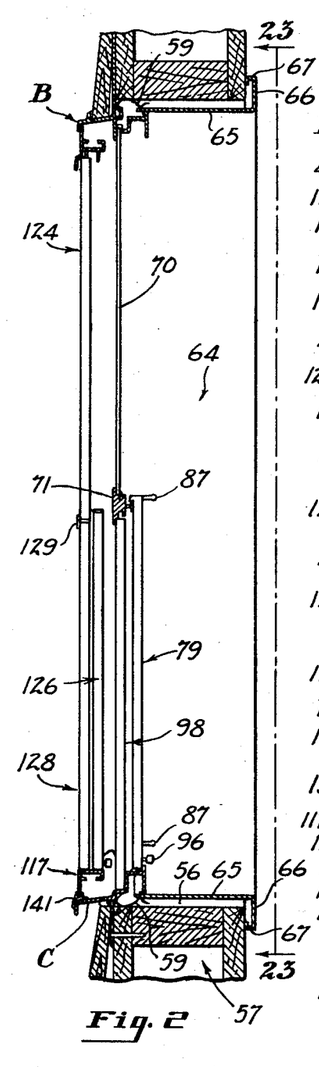
Fig. 2 is a vertical section taken on the line indicated at 2—2 in Fig. 1.

As shown in Fig. 2 of the drawings, the window of the present invention may be mounted in an opening 56 of a building wall 57, with the attaching flanges 4 and 24 of the jambs A and head B in engagement with the exterior face of the building wall. An attaching strip 58 secured to the wall 57 below the opening 56 may be received in the channel 46 of the sill C. In order to center the window frame in the opening 56 a series of springs 59 are mounted exteriorly of the jambs, head and sill for engagement with the sides, top and bottom of the wall opening 56. The springs 59 are in the form of curved sheet metal plates having curved outer end portions 60 extending into the channels formed between the flanges 13 and the web 3 of the jambs, between the flange 53 and web 43 of the sill, the outer ends of the sheet metal springs engaging with the ribs 14, 34 and 54 and the curved outer end portions 60 engaging the webs 3 of the jambs, the flange 24 of the head and the flange 44 of the sill. The springs 59 are of short length and several of these springs may be spaced apart along the length of each jamb and along the length of the head and the sill. The inner end portions 62 of the springs 59 are curved on a longer radius than the outer end portions 60 and the inner free ends of the springs 59 are bent at 63 to provide inclined portions that project outwardly from the exterior of the frame when the springs are mounted on the frame.

The portions 62 of the springs 59 have wedging engagement with the interior of the wall opening 56 as the frame is pushed into the opening and, since the outer end portions of the springs are backed by the webs 3 and 43 of the jambs and sill and by the attaching flange 24 of the head, the engagement of the springs with the interior of the wall opening compresses the springs and forces the inner ends thereof inwardly toward the exterior of the window frame. The springs 59 serve to center the window frame in the wall opening prior to the attachment of the flanges 4 and 24 to the exterior of the building wall.

Inwardly of the window frame there is preferably provided an interior trim casing 64 that has a rectangular tubular portion formed by four walls 65 that covers the interior of the wall opening inwardly of the window frame, the casing having trim portions 66 extending outwardly from the walls 65 at right angles thereto and overlying the interior of the building wall around the window opening. The trim portions 66 have reversely bent edge portions 67 provided with inturned flanges 68 that engage with the building wall. The rectangular tubular body within the wall opening composed of the four walls 65 is of a size to receive the inner edge of the window frame. The casing 64 can be pushed into the window opening from the interior and the outer edge of the wall 65 will engage with the inclined edge portions 63 of the springs 59 to force the free ends of the springs 59 outwardly sufficiently to permit the wall 65 to enter between the springs 59 and the wide edge faces 11, 31 and 51 of the flanges 10, 30 and 50 of the jambs, head and sill, the springs 59 serving to clamp the inner ends of the wall 65 against the edge faces 11, 31 and 51 of the window frame.

In the window illustrated in Figs. 1 to 7, both the primary window and the insulating window have vertically sliding glass mounting sashes. A fixed glass pane 70 is mounted in the upper portion of the window frame in the seats provided by the flanges 15 and 35 and the ledges 16 and 36 of the jambs and head. To support the glass pane 70 at its lower edge, a frame crossbar 71 is provided that has an outer face 72 in the plane of the outer faces of the flanges 15 and 35 of the jambs and head, the crossbar 71 having a flange 73 in the plane of the flanges 15 and 35 for engagement with the outer side of the glass pane and a ledge 75 that is alined with the ledges 16 of the jambs. The crossbar 71 is provided with a channel 74 that alines with the channels 7 of the jambs and the glass pane 70 is held in place by means of plastic retainer strips 76 mounted in the channels 7, 27 and 74. The crossbars 71 have identically formed upper and lower face portions and centrally thereof are provided with inwardly projecting webs 77 provided with upwardly and downwardly extending flanges 78, the inner faces of which are disposed substantially flush with the outer walls of the channels 8 of the jambs.

Figure 5:
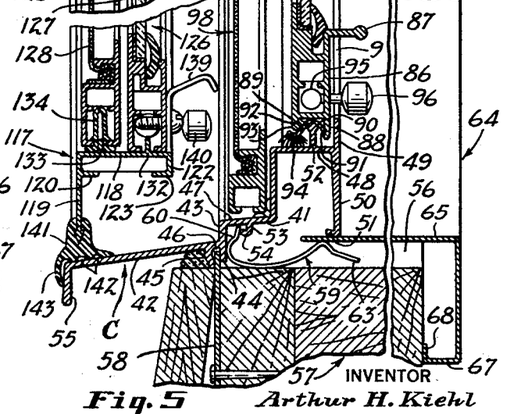
Fig. 5 is a fragmentary transverse vertical section through the sill, taken on the line indicated at 5—5 in Fig. 1.
Figure 7:
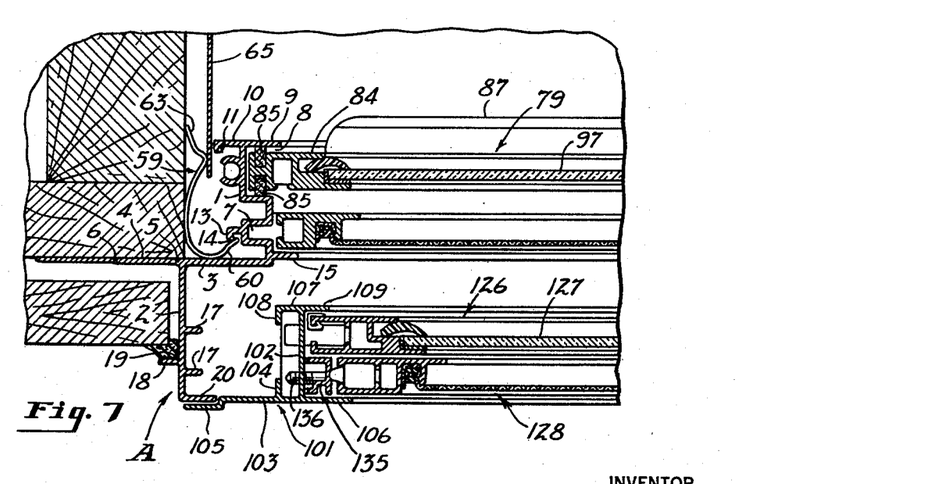
Fig. 7 is a tranverse horizontal section through the lower portion of a jamb, taken on the line indicated at 7—7 in Fig. 1.

A window sash 79 is mounted to slide vertically in the grooves 8 of the jambs and, as shown in Fig. 4, this sash has a top rail 80 provided with an L-shaped flange 81 extending outwardly from its top edge to provide a downwardly facing channel 82 which receives a sealing strip 83 for engagement with the upwardly extending flange 78 of the crossbar 71 when the sash is in closed position. As shown in Fig. 7, the sash 79 has side rails 84 that slide in the channels 8 and that are provided with sealing strips 85 of felt or the like that have sliding engagement with the inner and outer sides of the channel 8. As shown in Fig. 5, the sash 79 is provided with a bottom rail 86 and either or both of the sash rails 80 and 86 may be provided with a lifting flange 87 extending lengthwise thereof. The bottom rail 86 has inner and outer flanges 88 and 89 along its bottom edge that form a channel between them to receive a resilient sheet metal strip 90 that is bowed upwardly and that is engageable with the beaded rib 52 on the ledge 48 of the sill when the sash 79 is in its lowermost closed position. The metal strip 90 has its inner edge seated in a groove 91 formed in the flange 88 and is formed with a flange 92 for engagement with an inwardly projecting rib 93 on the flange 89. The metal strip 90 has a pile fabric sealing strip 94 attached to its outer end which engages with the ledge 48 outwardly of the rib 52 when the sash is in its closed position. The bottom rail 86 is provided with conventional jamb engaging lock bolts 95 that are projected or retracted by means of an operating knob 96.

All of the glass mounting sashes may be provided with glass seats and retaining members similar to those provided for the glass pane 70, the sash 79 being provided with a glass pane 97 mounted therein in the same manner that the pane 70 is mounted in the window frame.

The primary window assembly may include a screen 98 that is mounted between the lower edge of the jamb crossbar 71 and the ledge 47 of the sill, the top edge of the screen being provided with a rounded projection 99 that engages in the downwardly facing channel 74 of the crossbar 71.

Figure 6:
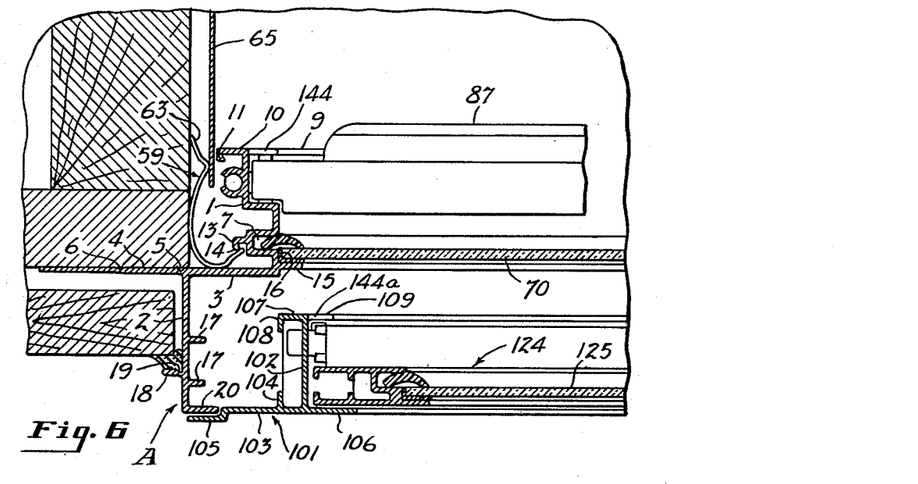
Fig. 6 is a horizontal tranverse section taken through the upper portion of a jamb on the line indicated at 6—6 in Fig. 1.

To accommodate an insulating window assembly having vertically sliding sashes, a sub-frame 100 is mounted within the outer portion of the window frame. As shown in Figs. 6 and 7, the frame 100 has vertical side bars 101 with webs 102 disposed parallel to and interiorly of the portions 2 of the jambs. At their outer edges the webs 102 have wide, exteriorly projecting flanges 103 provided on their inner sides with stiffening ribs 104 and having along their edges outwardly offset portions 105 that overlie the flanges 20 of the jambs. Flanges 106, that project interiorly from the outer edges of the web 102 in the plane of the flanges 103, form the outer walls of a sash receiving channel. The webs 102 have exterior flanges 107 provided with stiffening ribs 108 at their edges which project outwardly toward the flange 103. Interior flanges 109 in the plane of the flanges 107 form the inner wall of a sash receiving channel.

As shown in Fig. 3, the frame 100 has a top bar 110 which has a web 111 disposed in a plane at right angles to the plane of the web 102 of the vertical bars and a downwardly extending outer flange 112. A flange 113 extends upwardly from the web 111 in the plane of the flange 106 of the vertical bars and has an inwardly projecting stiffening rib 114. At its inner edge the web 111 has an upwardly extending portion 115 which terminates in an outwardly projecting flange 116.

As shown in Fig. 5, the frame 100 has a bottom bar 117 provided with a web 118 at right angles to the webs 102 of the vertical bars 101, and a downwardly projecting flange 119 at the outer edge of the web 118 that has an inwardly projecting stiffening rib 120. The bottom bar 117 has a downwardly projecting portion 122 at its inner edge that terminates in an outwardly projecting flange 123.

The side, top and bottom bars of the sub-frame 100 are extruded metal shapes which are mitered and/or notched at the corners to effect a snug fit and are secured together by suitable corner locking devices. The sub-frame 100 is mounted in the outer portion 2 of the window frame with the flange 113 of the top bar 110 within the flange 40 of the head B and with the edge portions 105 of the flanges 103 overlying the jamb flanges 20. The sub-frame may be installed from the outside after the window frame is in place and may be secured to the window frame by attaching the edge portions 105 of the flanges 103 to the vertical flanges 20 of the jambs in any suitable manner.

An outer storm sash 124 having a glass pane 125 mounted therein is normally supported in the upper portion of the frame 100 with its top rail engaging the interior of the flange 112, its side rails engaging the interior of the flanges 106 of the side bars 101. An inner storm sash 126 having a glass pane 127 is slidable vertically in the sub-frame 100 inwardly of the sash 124. A screen 128 may be mounted between the sash 124 and the web 118 of the bottom bar of the sub-frame, the upper rail of the screen being within a downwardly projecting flange 129 on the bottom rail of the sash 124.

The vertical rails 101, top rail 110 and bottom rail 117 of the insulating window frame are preferably extruded sections of a form suitable for use in a frame for vertically sliding sashes as shown in Figs. 3 to 7, or in a frame for horizontally sliding sashes. The flanges 106 and 109 of the vertical rails 101 provide channels of a width to receive the inner and outer sashes 124 and 126. The top rails have spaced downwardly extending ribs 130 and 131 inwardly of the flange 112 and the bottom rail has upwardly extending ribs 132 and 133 that are in vertical alinement with the ribs 130 and 131. The top rail of the outer sash 124 is slotted to receive the rib 131 of the top rail 110 and the bottom sash rail of the screen 128 is slotted to receive the rib 133 of the bottom rail 117.

Channel shaped plastic strips 134 adapted to snugly fit the ribs 131 and 133 are mounted in the sash slots and extend the full length of the sash rails. The ribs 130 and 131 of the top rail and 132 and 133 of the bottom rail serve as guides when the sashes of the insulating window are mounted to slide horizontally and the channel shaped plastic strips 134 serve as bearing members for the sashes when they are mounted to slide horizontally. Adapter strips 135 for the screen 128 are attached to the webs 102 of the vertical rails adjacent the inner faces of the flanges 106 by means of screws 136. The strips 135 are of a width corresponding to the thickness of the side rails of the screen 128, limit the downward movement of the outer sash 124 when the screen 128 is removed and serve as stops to guide the inner sash 126.

A weatherstrip 137 attached to the upper rail of the inner sash 126 has a flexible tongue 138 that presses against the outer sash 124. A suitable finger grip 139 may be provided on the bottom rail of the sash 126 for lifting the same. The lower sash 126 may be provided with conventional lock bolts that are moved into and out of engagement with openings in the webs 102 of the side bars 101 by means of an operating knob 140.

To seal the space between the bottom of the auxiliary window frame 100 and the sill C, an elastic rubber sealing strip 141 may be provided which is bonded or otherwise attached to the flange 119 of the bottom rail 117 and which has a wide bottom with longitudinal grooves 142 providing spaced ribs that engage the portion 42 of the sill, the strip 141 also having a flange 143 that overlies the flange 55 of the sill.

The sashes and screens are all removable from inside the window, the opening between the crossbar 71 and the sill C being of a size to permit the insertion and removal of the storm sash and screen from inside the window.

The upper portions of the flanges 9 of the main frame and of the flanges 109 of the auxiliary insulating window frame 100 are cut away to provide openings 144 and 144a as shown in Fig. 6, which permits the sash 79 to be removed inwardly from the main frame when it is moved upwardly to a position near the top of the window frame and the sashes 124 and 126 to be removed in a similar manner from the auxiliary frame 100. After removal of the sash 79 the screen 98 may be removed by tilting the top thereof inwardly and withdrawing it through the inner portion of the frame. It will be noted that the frame 100 in which the insulating sashes are mounted is spaced outwardly from the inner primary window housing portion of the frame and that the insulating window housing portion of the main frame is of greater height and width than the primary window housing portion. The space between the sub-frame 100 and the outer portion of the primary window portion of the frame is greater than the thickness of the insulating sashes, so that when a sash is detached from the frame 100 is can be moved laterally or vertically within the frame to facilitate its removal through the opening below the frame crossbar 71.

Figure 15:
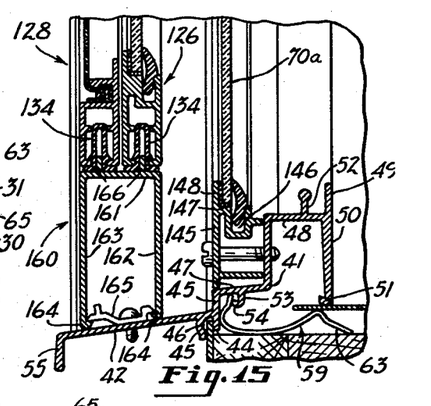
Fig. 15 is a vertical transverse section through the sill, taken on the line indicated at 15—15 in Fig. 8.

In Figs. 8 to 15 a window having horizontally sliding sashes is shown. In this window the same structural shapes are provided for the jambs, head and sill as in the frame for vertically sliding sashes, the frame being elongated horizontally instead of vertically. A fixed glass pane 70a is mounted in one end of the horizontally elongated window frame between a vertically disposed frame crossbar 71 and one of the jambs. The pane 70a extends the full height of the window frame opening and is seated against the flanges 35 and 73 of the head B and crossbar 71 between the ledges 36 and 75 and against the flange 15 and within the ledge 16 of one of the jambs. To provide a seat for the bottom edge of the pane 70a, an adapter bar 145 is mounted on the ledge 47 of the sill between the bar 71 and a jamb A. As shown in Fig. 15, the adapter bar 145 has a channel 146 alined with the channel 7 of the jamb and the channel 74 of the bar 71 and a glass supporting ledge 147 alined with the ledges 16 of the jamb and 75 of the bar 71. The adapter bar also has an upwardly projecting flange 148 that is alined with the flanges 15 of the jambs and 73 of the bar 71 and is detachably secured to the sill by means of screws or other suitable attaching means.

Figures 8, 9, 10:
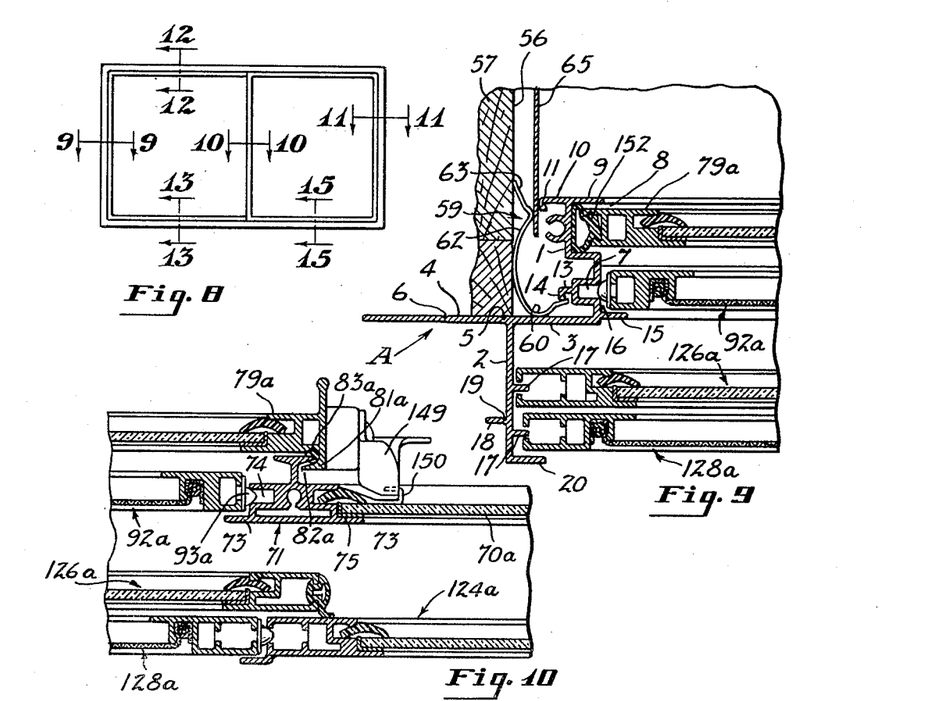
Fig. 8 is a diagrammatic view of a window having horizontally sliding sashes.
Fig. 9 is a tranverse horizontal section through one of the jambs, taken on a line indicated at 9—9 in Fig. 8.
Fig. 10 is a fragmentary horizontal section through the central vertical crossbar of the frame, taken on the line indicated at 10—10 in Fig. 8.
Figure 11:
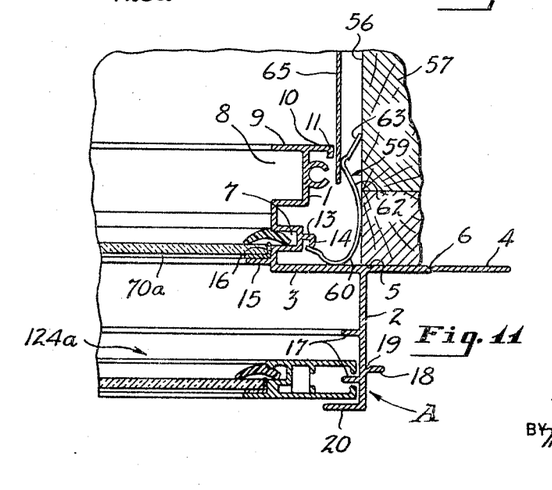
Fig. 11 is a transverse horizontal section through the jamb opposite that shown in Fig. 9, taken on the line indicated at 11—11 in Fig. 8.
Figures 12, 13, 13A, 14:
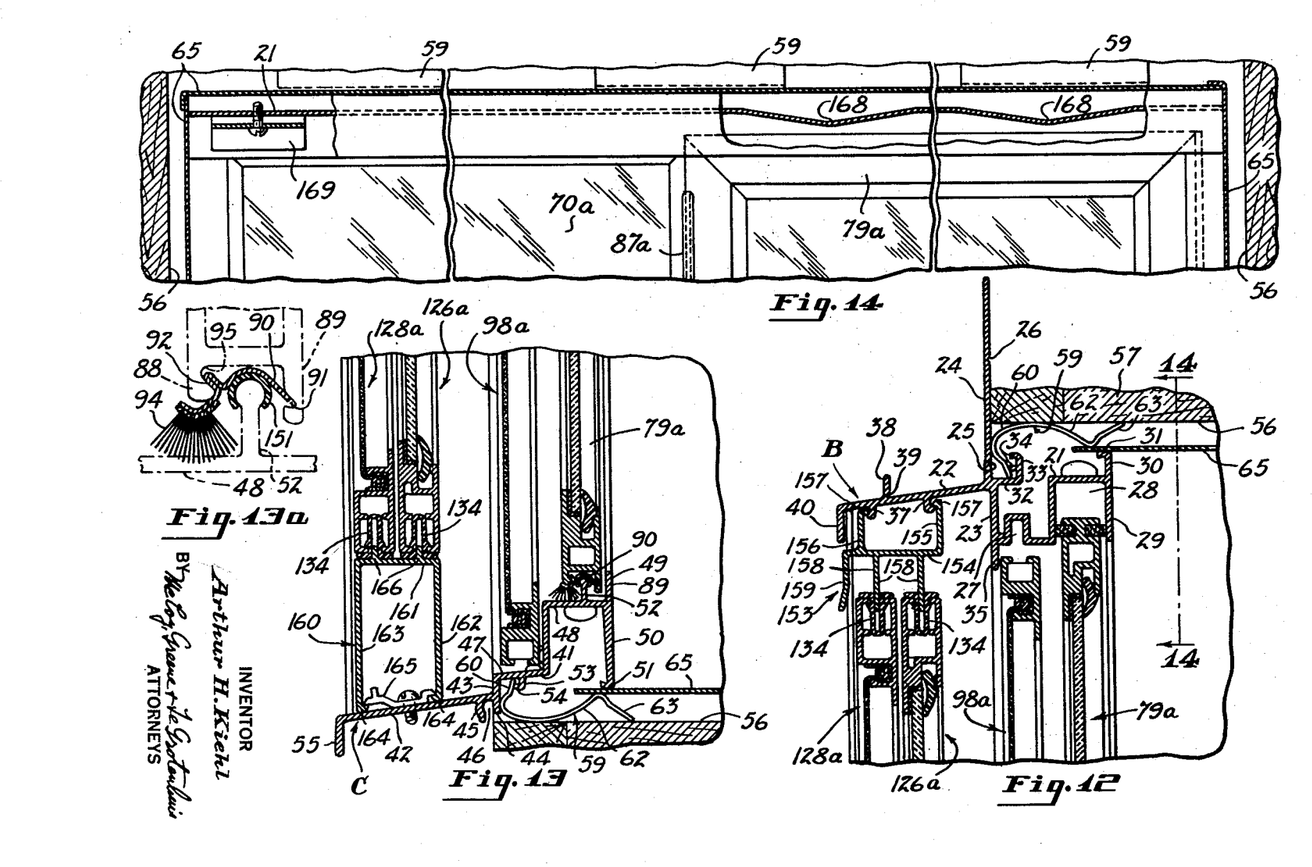
Fig. 12 is a transverse vertical section through the frame head taken on the line indicated at 12—12 in Fig. 8.
Fig. 13 is a transverse vertical section through the sill taken on the line indicated at 13—13 in Fig. 8.
Fig. 13a is a fragmentary section on a larger scale than in Fig. 13, showing the support for the sliding sash of the main window.
Fig. 14 is a longitudinal vertical section through the head taken on the line indicated at 14—14 in Fig. 12, with portions of the frame broken away to show portions of the top sash channel.

A sash 79a slides horizontally in the channel 28 of the head and on the rib 52 on the ledge 48 of the sill. The vertical rail of the sash 79a at the end thereof toward the side of the frame in which the fixed pane 70a is mounted, has an L-flange 81a providing a channel 82a to receive a sealing strip 83a for engagement with a flange 78a of the vertically disposed crossbar 71. The vertical rail of the sash 79a with its flanges 81a provides a wide base to receive a rotatably mounted latch member 149 that engages with a keeper 150 attached to the frame bar 71 to lock the sash 79a in closed position. As shown in Figs. 13 and 13a, the weight of the sash is supported on the guide rib 52 by the metal strip 90 that carries the sealing strip 94, the beaded edge of the guide rib 52 being provided with a cap 151 of a suitable plastic material to provide a bearing surface for engagement with the metal strip 90. As shown in Fig. 9, a sealing strip 152 may be provided on the vertical rail of the sash 79a opposite that on which the lock 149 is mounted for engagement in the groove 8 of the jamb in which the sash engages when in closed position. A screen 92a may be mounted between the vertical bar 71 and the jamb opposite that in which the glass pane 70a is mounted, the vertical rail of the screen being provided with a rounded projection 93a for engagement in the groove 74 of the crossbar 71 that faces the opening in which the screen is mounted.

An auxiliary insulating window frame employing the side, top and bottom rails 101, 110 and 117 of the frame 100 and identical with the frame 100 except as to relative vertical and horizontal dimensions may, as previously explained, be used to mount horizontally sliding sashes. However, to provide greater range of vision through the insulating window, the sashes may occupy the entire space between the outer frame portions 2 of the jambs A, in which case the sashes of the insulating window are mounted between adapter guide bars 153 and 160 attached to the head B and sill C and extending the full length thereof as shown in Figs. 12 and 13, the slotted ends of the insulating window sashes receiving the ribs 17 of the jamb when in closed position as shown in Fig. 9.

As shown in Fig. 12, the adapter bar 153 is mounted in the outer portion of the frame head B. The bar 153 has a horizontally disposed web 154 and flanges 155 and 156 which project upwardly from adjacent the inner and outer edges thereof. The flanges 155 and 156 straddle the hook flanges 37 on the under side of the head B and are provided with hooked ends 157 that spring into engagement with the hooked flanges 37 when the bar 153 is pressed upwardly toward the head B to cause the hooked ends 157 of the flanges 155 and 156 to spring over the hooked flanges 37 into locking relation therewith. The adapter bar 153 has spaced guide ribs 158 extending vertically downwardly from the web 154. At its outer edge the bar 153 has a downwardly extending retaining flange 159.

As shown in Fig. 13, the bottom adapter bar 160 is attached to the portion 42 of the sill and this bar has a horizontal web 161 and inner and outer flanges 162 and 163 extending downwardly from the web 161. The flanges 162 and 163 have hooked portions 164 at their lower edges. The flanges 162 and 163 straddle retaining clips 165 that have end portions which engage with the hooks 164 to secure the bar 160 to the sill, the clips being so formed that the flanges 162 and 163 may be sprung into engagement with the clips by pushing the same downwardly against the clips.

The bar 160 has parallel vertical guide ribs 166 projecting upwardly from the web 161 and outer and inner sliding sashes 124a and 126a have top and bottom rails recessed to receive the guide ribs 158 and 166 and are provided with plastic U-shaped bearing inserts 134 for engagement with the guide flanges 158 and 166. A screen 128a may be mounted between the outer sash 124a and one end of the frame, the screen being also provided with recesses in its top and bottom rails to receive the outer guide flanges 158 and 166 and being provided with plastic inserts 134 for engagement with the guide flanges 158 and 166.

As shown in Fig. 14, the portion of the frame head forming the top of the downwardly facing channel 28 has integral depressed portions 168 which overlie the top edges of the sash 79a when the sash is in its closed position to retain the sash on the guide rib 52 when the sash is in closed position. When the sash 79a is moved laterally to a position behind the glass pane 70a, the sash is free of the depressed portions 168 and may be lifted into the channel 28 to free the lower rail from the guide rib 52 and the retaining flange 49 so that the lower edge of the sash may be swung inwardly out of the frame to enable the sash to be removed from the frame. In order to limit the movement of the sash 79a horizontally and to prevent engagement of the lock 149 with the jamb toward which the sash 79a moves when opening, a stop member 169 is mounted in the channel 28 adjacent the jamb in which the glass pane is mounted. The screen 98a can be removed after removal of the sash 79a, by tilting the top thereof inwardly clear of the head B and lifting it out.

Each of the sashes and the screen of the storm window can be detached from the guide flanges 158 and 166 by lifting it to free it from its guide flange 166, swinging its lower end inwardly and allowing it to drop between the lower adapter bar 160 and the portions of the sill upon which the prime window is mounted. After so removing a sash or screen from between the adapter bars, it can be moved out edgewise through the opening between the vertical crossbars 71 and the jamb at the end of the frame opposite that in which the fixed glass pane is mounted. The sashes are thus conveniently mounted for removal to permit washing of the glass panes, and can be readily reinserted.

It is to be understood that the window assemblies herein shown and described may be provided with weatherstrip seals of types well known in the art.

Figure 16:
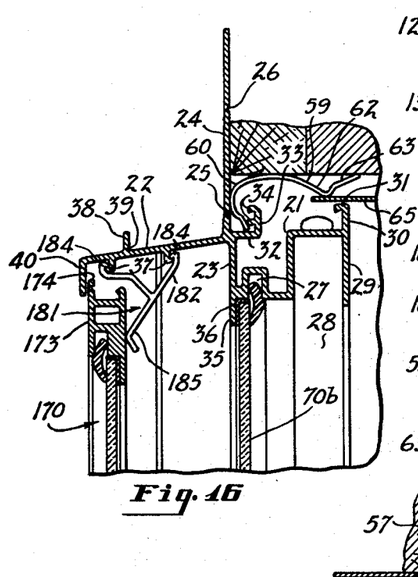
Fig. 16 is a transverse vertical section through the head portion of a picture window assembly having a single fixed pane and a removable storm sash.
Figure 17:
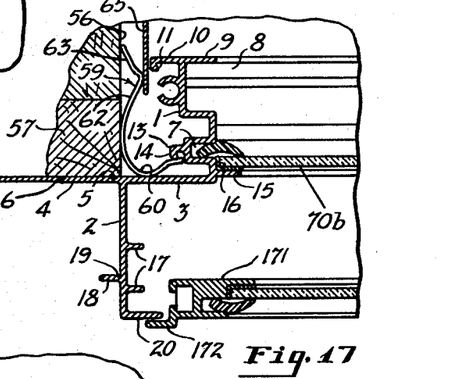
Fig. 17 is a transverse horizontal section through the jamb of the picture window assembly.
Figure 18:
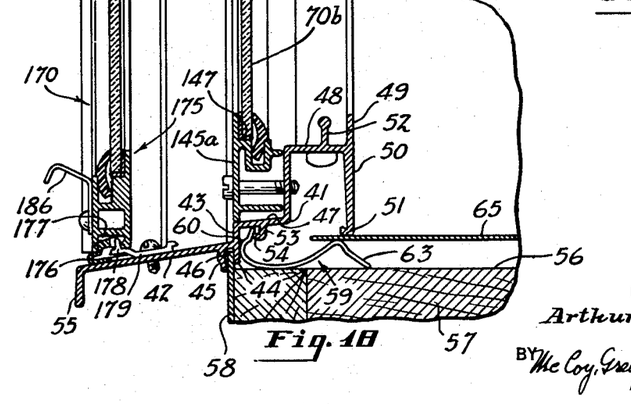
Fig. 18 is a vertical transverse section through the sill of the picture window assembly.
Figure 19:
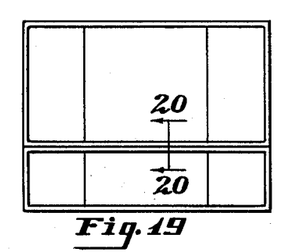
Fig. 19 is a diagrammatic view showing a window with superposed or stacked frames.

In Figs. 16, 17 and 18 of the drawings a construction of the picture window type is shown in which the glass of the primary window is mounted in the frame. As shown in Figs. 16, 17 and 18, a fixed glass pane 70b is mounted within the glass ledges 16 and 36 of the jamb and head and on the glass ledge 147 of an adapter bar 145a which is identical with the adapter bar 145 previously described except that it extends from jamb to jamb. For use with a primary window consisting of a fixed glass pane, an insulating or storm window is provided that is in the form of a single sash 170 having side rails 171 with outwardly offset flanges 172 that overlap the flanges 20 of the jamb 2, a top rail 173 that has an upwardly extending flange 174 that is received within the flange 40 of the head and a bottom rail 175 that closely overlies the portion 42 of the sill and that may have a sealing strip 176 for engagement with the sill. The bottom rail 175 has an opening 177 to receive a pin 178 carried by a retaining member 179 attached to the portion 42 of the sill. Retaining clips 181 are attached to the portion 22 of the head B. These clips have resilient divergent arms 182 and 183 provided with hooked ends 184 adapted to be sprung over the hooked flanges 37 on the underside of the head to lock the clips to the head. Each of the clips has an inclined stop arm 185 that engages the inner face of the top rail 173 of the sash 170 to hold it against the flange 40. The bottom rail 175 is provided with a finger clip 186 by means of which the sash may be lifted to free it from the retaining pin 178, after which the lower end of the sash may be swung outwardly and the sash lowered to remove it from the frame.

Figure 21:
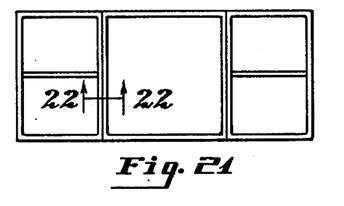
Fig. 21 is a diagrammatic view of a window having frames disposed side by side with abutting jambs forming mullions.
Figure 22:
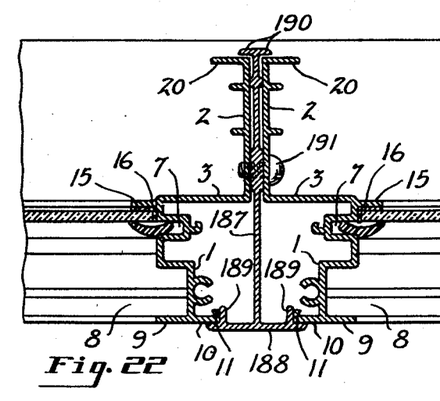
Fig. 22 is a transverse horizontal section take on the line indicated at 22—22 in Fig. 21.
Figure 23:
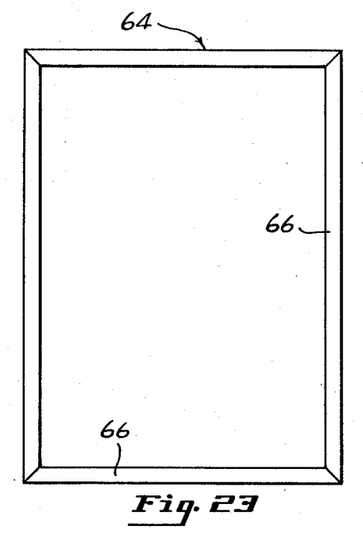
Fig. 23 is a front elevation of an assembled trim frame.
Figures 24, 25:
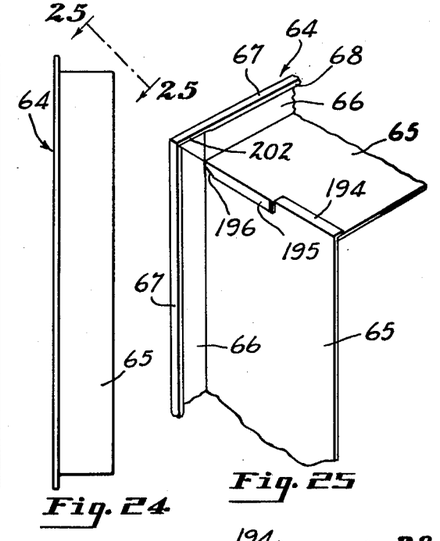
Fig. 24 is a side elevation of the trim frame.
Fig. 25 is a fragmentary perspective of a corner of the trim frame, viewed as indicated at 25—25 in Fig. 24.
Figures 26, 27, 28, 29:
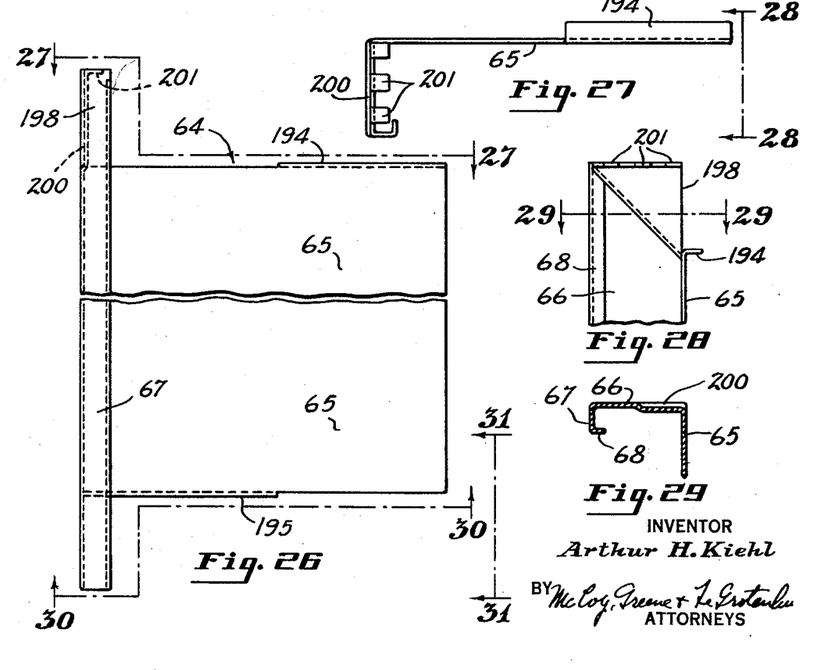
Fig. 26 is a side elevation of one of the trim frame sections.
Fig. 27 is an end elevation of a trim frame section viewed as indicated at 27—27 in Fig. 26.
Fig. 28 is a fragmentary end elevation of a frame section, viewed as indicated at 28—28 in Fig. 27.
Fig. 29 is a section taken on the line indicated at 29—29 in Fig. 28.
Figure 30:
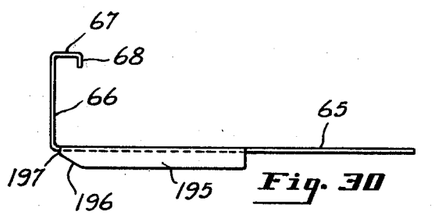
Fig. 30 is an end elevation of a trim frame section, viewed as indicated at 30—30 in Fig. 26.
Figure 31:
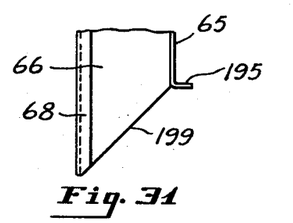
Fig. 31 is a fragmentary elevation of a mitered end of the trim flange viewed as indicated at 31—31 in Fig. 26.

As shown in Figs. 21 and 22, two window frames of the present invention may be mounted side by side in a window opening by removing the attaching flanges 4 and stop flanges 18 of the two jambs which are to be secured together. The adjacent jambs of the multiple frame window are secured back to back by means of a T-shaped spacer post having a web 187 of a width to extend the full width of the jambs and having inner flanges 188 at right angles to the web 187 that overlie the flanges 10 at the inner edges of the adjacent jambs and that have integral spacer ribs 189 for engagement with the edges 11 of the flanges 10. Short flanges 190 at the outer edge of the web 187 overlie the flanges 20 at the outer edges of the jambs and the portions 2 of the jambs are secured to the web 187 by means of attaching bolts 191.

Figure 20:
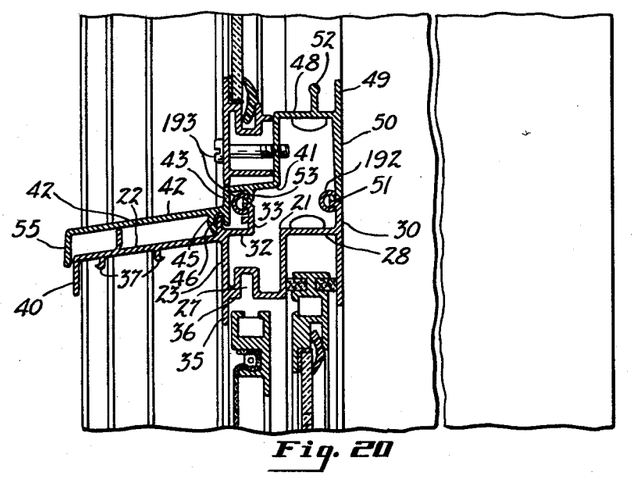
Fig. 20 is a transverse vertical section taken on the line indicated at 20—20 in Fig. 19.
Figure 20A:
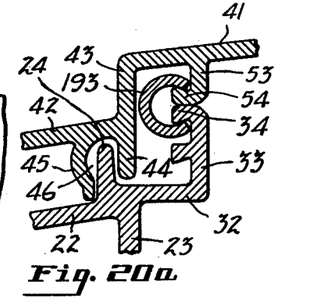
Fig. 20a is a fragmentary section on a larger scale than in Fig. 20, showing one of the locking keys fastening together the head and sill of stacked frames.

As shown in Figs. 20 and 21, two frames may be secured in stacked relation by breaking off the attaching flanges 24 of the head along the grooves 25. This leaves a short flange on the head that is adapted to enter the channel 46 of the sill to aline a sill C with a head B upon which it is placed. With a head and sill so positioned the wide edge face 51 of the flange 50 rests upon the wide edge face 31 of the flange 30 and the out-turned edge 54 of the flange 53 rests upon the out-turned edge 34 of the flange 33. Metal locking keys 192 and 193 of approximately C-shape may be slid endwise over the superposed outwardly projecting portions 31 and 51 and over the outwardly projecting portions 34 and 54 to lock the sill to the head.

The trim casing 64, which may be formed of sheet steel and provided with a paint or enamel coating, has its sections formed so that they can be quickly and easily assembled and permanently joined together without the use of separate attaching means such as screws, bolts or clips. The trim casing 64 is composed of four sections, each including one of the flat body portions 65 that forms a wall of the tubular portion of the casing. Each section is provided at one end with a flange 194 that extends from the free edge of the body portion 65 to a point substantially midway between said free edge and the trim portion 66 of the section and that project from the interior face of the portion 65 at right angles thereto. The opposite end of each section is provided with a flange 195 projecting in the same direction as the flange 194 and extending from near the trim portion 66 to a point substantially midway between the trim portion 66 and the free edge of the body portion 65. The end of the flange 195 adjacent the trim portion 66 may have its corner cut away to provide a beveled edge 196 and a short end shoulder 197. The ends of the trim portions of each section extend past the side edges of the body portion 65 and overlap when the sections are joined together to provide a corner joint. At the end of the section provided with the flange 194, the entire trim portion 66 projects past the end of the portion 65 to provide an attaching projection 198 of a length but slightly less than the width of the portion 66. The opposite end of each section is provided with a mitered projecting portion 199 having its outer end edge disposed at an angle 45° to the portion 66 of the section and extending to the inner end of the flange 195.

The face of the projection 198 has a triangular depression 200 which receives the mitered projecting portion 199 of the trim 66 to provide a mitered joint in which the external faces of the trim portions 66 are flush. The outer end of each projection 198 is provided with a toothed flange 201 projecting toward the flange 68 that engages the inner side of the portion 67 of the section with which the projection 198 engages. The sections may be permanently locked together by bending a portion of each flange 68 over the underlying toothed flange 201 in each corner of the casing.

Figure 32:
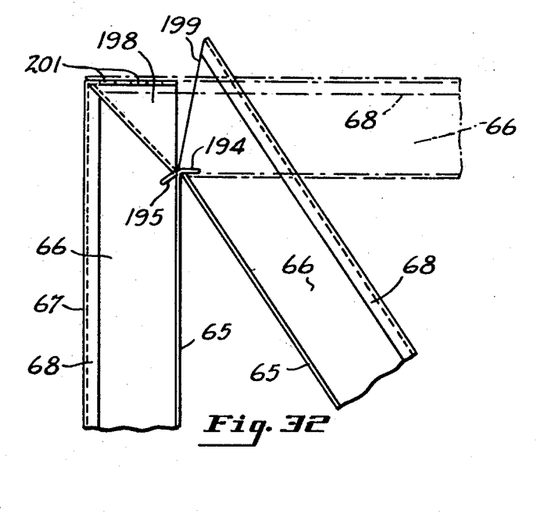
Fig. 32 is a fragmentary view showing the manner in which the frame sections are brought into interlocking relation at three corners of the frame.
Figure 33:
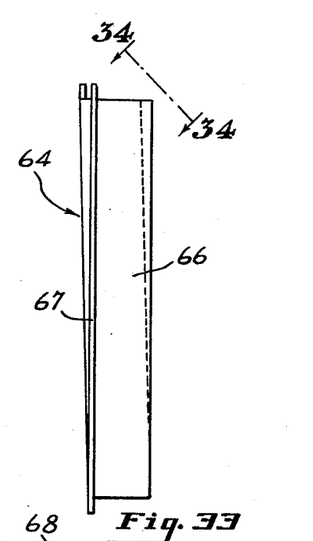
Fig. 33 shows the frame sections in the positions they occupy during movement of the sections into interlocking relation at the fourth corner of the frame.
Figure 34:
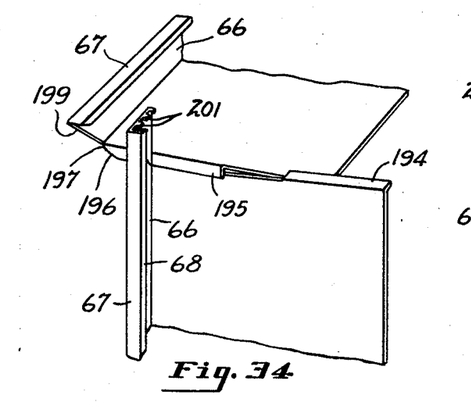
Fig. 34 is a fragmentary perspective viewed as indicated at 34—34 in Fig. 33, showing how the sections have moved into interlocking relations at the fourth corner to complete the frame assembly.
Figure 35:
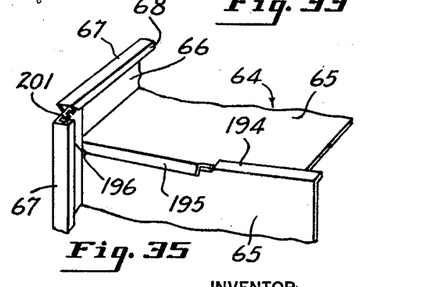
Fig. 35 shows the sections just prior to the completion of the interlocking operation.

In assembling the casing the sections are joined at three of the corners simply by inserting the flange 195 into the space between the flange 194 and the inner face of the integral trim portion 65 of the adjoining sections, with the sections disposed at an angle as shown in Fig. 32, then swinging the sections to the position shown in dotted lines in Fig. 32. The fourth joint is formed by springing the free ends of the sections to be connected at the fourth corner laterally one with respect to the other, to permit the free edge of one section 65 to be inserted beneath the flange 194 of the other section and the flange 195 of the first-mentioned section to be engaged with the exterior face of said other section as shown in Fig. 33. The flexibility of the body portions 65 of the sections permits the section having its free edge beneath the flange 194 of the other section to be moved laterally with respect to the other section to advance the flange 195 toward the flange 194 with the edge of the flange 195 sliding on the edge of the body portion 95 of the other section adjacent the projecting end of the trim portion 66 of said other section. As the flange 195 of one section moves toward the flange 194 of the other, the section so moved is bowed between the portion engaging the inner side of the flange 194 and the portion engaging the edge of the body portion 65 of the other section, causing increased pressure on the edge of the flange 195 due to the resiliency of the sheet metal. In order to relieve this pressure as the outer end of the flange 195 approaches the inner end of the flange 194, the bevel 196 is provided. During this movement the mitered end 199 moves toward the depression 200 in the projecting portion 198 formed to receive it. In the final portion of this movement, the flange 195 snaps into place engaging the mitered end 199 in the depression 200 and the end shoulder 197 of the flange 195 with the inner face of the trim portion 66 of the other section. With the flanges so positioned, the sections are firmly interlocked, but, in order to provide a permanent connection which will prevent springing apart of the overlapping projecting portions 198 and 192, an end portion of each flange 68 is preferably bent over into engagement with the toothed flange 201.

It is to be understood that in accordance with the provisions of the patent statutes, variations and modifications of the specific devices herein shown and described may be made without departing from the spirit of the invention.

What I claim is:

1. The combination with a building wall having an opening, of a metal window frame having a head, a sill and jambs connecting the head and sill and joined thereto, said frame having positioning portions for engagement with the exterior of the building wall, and means for centering said frame in the window opening comprising a series of resilient metal springs mounted on the exterior of the head, sill and jambs of said frame inwardly of said positioning portions, said springs being outwardly bowed and inwardly compressible with respect to the exterior of the frame, said springs having face portions inclined inwardly toward the center of the frame that are engageable with portions of the building wall surrounding the opening when the frame is pressed into the window opening, the springs normally projecting outwardly from the frame a distance greater than the clearance between the frame and wall so that the springs are compressed upon insertion of the window frame into the wall opening.

2. The combination with a building wall having an opening, of a metal window frame having a head, a sill and jambs connecting the head and sill and joined thereto, said frame having positioning portions for engagement with the exterior of the building wall, means for centering said frame in the window opening comprising a series of resilient metal springs mounted on the exterior of the head, sill and jambs of said frame inwardly of said positioning portions and normally projecting outwardly with respect to the exterior of the frame a distance greater than the clearance between the frame and wall, said springs having free inner ends and being bowed outwardly intermediate their ends to provide free end portions that are inclined inwardly toward the center of the window opening and that are engageable with the building wall when said frame is inserted into said wall opening to place the springs under compression between the frame and the portions of the building wall surrounding the opening, and an interior trim casing having walls covering the portion of the building wall surrounding said opening inwardly of said window frame, said trim casing having a tubular portion extending into the window opening surrounding the inner edge of said window frame and clamped to said frame by said springs and an outwardly extending trim portion engageable with the interior of the building wall around the window opening.

3. The combination with a building wall having a rectangular window opening of a rectangular tubular metal window frame having an inner portion within the window opening and positioning portions for engagement with the exterior of the building wall, a trim casing having a rectangular tubular portion with flexible walls within the window opening that telescopically and slidably receives the inner portion of said window frame and a trim portion that extends outwardly from said tubular portion at its inner end and that engages with the interior of the building wall around said opening, and spring clamping members under compression between the outer ends of the flexible walls of said tubular portion and the building wall and exerting an inward pressure on said flexible walls to press the same against the exterior of said frame.

4. The combination with a building wall having a rectangular window opening of a rectangular tubular metal window frame having an inner portion within the window opening and positioning portions for engagement with the exterior of the building wall, a trim casing having a rectangular tubular portion within the window opening that telescopically and slidably receives the inner portion of said window frame and a trim portion that extends outwardly from said tubular portion at its inner end and that engages with the interior of the building wall around said opening, said trim frame comprising four sections each forming a wall of the tubular portion, each of said sections having an integral trim portion and said trim portions being secured together at the corners of the trim frame, the portions of said sections forming each wall of said tubular portion being flexible and movable relative to adjacent walls of said tubular portion to permit slight expansion of the frame receiving outer end portion thereof, and means for pressing said walls of said tubular portion inwardly against the exterior of said window frame.

5. The combination with a building wall having a rectangular window opening of a rectangular window frame having a one piece metal head, a one piece metal sill and one piece metal jambs connecting the head and sill and joined thereto, said frame having positioning portions spaced outwardly from its inner side for engagement with the exterior of the building wall, centering springs mounted on the exteriors of the head, sill and jambs of said frame inwardly of said positioning portions, said springs normally projecting outwardly from the exterior of the frame a distance greater than the clearance between the frame and wall and having free inner ends, said springs being bowed outwardly intermediate their ends to provide free end portions that are inclined inwardly toward the center of the window opening and that are engageable with the sides of said opening when said frame is inserted into said opening to place the springs under compression between said frame and the portions of the building wall surrounding the opening, and an interior trim casing having a rectangular tubular portion that is received in the window opening and that telescopically receives the inner portion of said window frame and a trim portion at its inner end extending outwardly from said tubular portion for engagement with the interior of the building wall around said window opening, the walls of said tubular portion of said trim casing being slidably received between said window frame and the inner ends of said springs which press against said trim casing walls to retain said trim casing in adjusted position with respect to said frame.

6. A window frame comprising a head, a sill and jambs connecting the head and sill and joined thereto, the jambs being of identical cross section, said head, sill and jambs being extruded metal structural shapes and being formed to provide an inner frame portion for receiving a primary window assembly and an outer frame portion for receiving an insulating window assembly, said head and said jambs having coplanar inwardly projecting pane positioning flanges at the juncture of said inner and outer portions and alined seats for a glass pane immediately adjacent to and inwardly of said flanges and sash guiding portions inwardly of said seats, and a frame cross member in said inner frame portion having a flange coplanar with said pane positioning flange and a glass pane seat alined with the seats of the head and jambs and a sash engaging portion inwardly of said seats.

7. A window frame such as set forth in claim 6, in which said cross member extends from jamb to jamb.

8. A window frame such as set forth in claim 6, in which said frame cross member extends from head to sill.

9. A window frame comprising a head, a sill and jambs connecting said head and sill and joined thereto, the head, sill and jambs each being in the form of a one-piece extruded structural shape, said head, sill and jambs being formed to provide the frame with an inner primary window receiving portion and an outer insulating window receiving portion, the portions of the jambs and head forming the inner primary window receiving portion of the frame having coplanar inwardly projecting glass retaining flanges and alined glass pane seats extending the full length thereof immediately adjacent and inwardly of said flanges and sash retaining portions inwardly of said seats, a cross bar connecting said inner portions of said head and sill intermediate the jambs, said cross bar having a glass retaining flange coplanar with the flanges of the jambs and head, a glass pane seat alined with the seats of the head and jambs and a sash engaging portion inwardly of said seat, and an adapter bar attached to the sill and extending between said cross bar and a jamb and having a glass retaining flange and a glass pane seat alined with the flanges and seats of the cross bar and jamb.

10. The combination with a building wall having an opening of a metal window frame having a head, a sill and jambs connecting the head and sill and joined thereto, said frame having positioning portions for engagement with the exterior of the building wall, means for centering said frame in the window opening comprising a series of resilient metal springs mounted on the exterior of the head, sill and jambs of said frame inwardly of said positioning portions and normally projecting outwardly with respect to the exterior of the frame a distance greater than the clearance between the frame and wall, said springs having free inner ends and being bowed outwardly intermediate their ends to provide free end portions that are inclined inwardly toward the center of the window opening and that are engageable with the building wall when said frame is inserted into said wall opening to place the springs under compression between the frame and the portions of the building wall surrounding the opening.

11. A window frame comprising a head, a sill and jambs connecting the head and sill and joined thereto, the head, sill and jambs each being in the form of a one-piece extruded structural shape, said head, sill and jambs being of substantially the same width and having inner portions providing an inner frame portion for receiving a primary window assembly and outer portions poviding an outer frame portion for receiving an insulating window assembly, the outer portions of said head and sill being offset upwardly and downwardly, respectively, with respect to the inner portions of said head and sill and the outer portions of said jambs being offset laterally outwardly with respect to the inner portions of said jambs so that the outer auxiliary window receiving portion of the frame is of greater height and width than the inner primary window receiving portion, coplanar webs connecting said inner and outer portions of the head, sill and jambs, and positioning flanges projecting outwardly from the head and jambs substantially in the plane of said webs.

12. A window frame comprising a head, a sill and jambs connecting the head and sill and joined thereto, the head, sill and jambs each being in the form of a one-piece extruded structural shape, said head, sill and jambs being of substantially the same width and having inner portions providing an inner frame portion for receiving a primary window assembly and outer portions providing an outer frame portion for receiving an insulating window assembly, the outer portions of said jambs being offset laterally outwardly from the inner portions thereof and connected to said inner portions by coplanar webs disposed at right angles to said outer portions, positioning flange projecting outwardly from said outer portions of the jambs substantially in the plane of said webs, outwardly projecting stop flanges on said outer portions of said jambs that are spaced outwardly from said positioning flanges, said flanges having weakening grooves adjacent the exterior faces of said jambs to facilitate removal of said flanges and placement of frames side by side in a window opening.

13. A window frame comprising a head, a sill and jambs connecting the head and sill and joined thereto, the head, sill and jambs each being in the form of a one-piece extruded structural shape, said head, sill and jambs being of substantially the same width and having inner portions providing an inner frame portion for receiving a primary window assembly and outer portions providing an outer frame portion for receiving an insulating window assembly, the outer portions of said head and jamb being inclined outwardly and downwardly at substantially the same inclination, said head having an upwardly projecting positioning flange inwardly of the outer side of the frame and an upwardly projecting stop flange spaced outwardly from said positioning flange, said flanges having weakening grooves adjacent the exterior face of said head to facilitate removal of said flanges and placement of frames one above another in a window opening.

References Cited in the file of this patent

UNITED STATES PATENTS

| | | |
|---|---|---|
| 2,477,942 | Renton | Aug. 2, 1949 |
| 2,512,298 | Bonnell | June 20, 1950 |
| 2,595,016 | Spector et al. | Apr. 29, 1952 |
| 2,607,453 | Smith | Aug. 19, 1952 |
| 2,611,156 | Toth | Sept. 23, 1952 |
| 2,614,298 | Ketchum | Oct. 21, 1952 |
| 2,614,665 | Floyd | Oct. 21, 1952 |
| 2,703,158 | Hauck | Mar. 1, 1955 |
| 2,703,635 | Carlson | Mar. 8, 1955 |
| 2,714,430 | Peterson | Aug. 2, 1955 |
| 2,740,998 | Zitomer | Apr. 10, 1956 |
| 2,760,607 | Bongiovanni | Aug. 28, 1956 |
| 2,764,235 | Renton | Sept. 25, 1956 |
| 2,770,018 | Seibert | Nov. 13, 1956 |
| 2,773,571 | Kelly | Dec. 11, 1956 |
| 2,776,735 | Bancroft | Jan. 8, 1957 |
| 2,776,737 | Bianco | Jan. 8, 1957 |
| 2,803,857 | Muessel | Aug. 27, 1957 |
| 2,804,954 | Gillespie | Sept. 3, 1957 |
| 2,812,812 | Hauck | Nov. 12, 1957 |